2,797,195

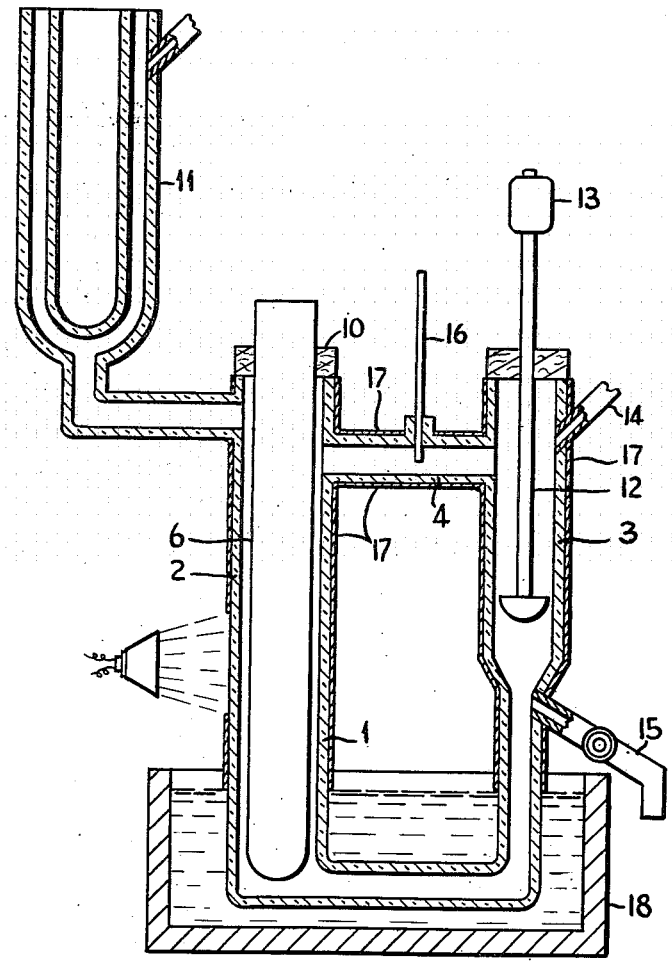

PRODUCTION OF BENZENE HEXACHLORIDE

Joseph A. Neubauer, Pittsburgh, Pa., Franklin Strain, Barberton, and Frederick E. Kung, Akron, Ohio, and Frederick C. Dehn, New Martinsville, W. Va., assignors to Columbia-Southern Chemical Corporation Application December 3, 1952, Serial No. 323,853

8 Claims. (Cl. 204—163)

This invention pertains to the preparation of benzene hexachloride and has particular relation to the preparation of benzene hexachloride under conditions which produce an optimum amount of the gamma isomer thereof.

It is known that benzene hexachloride may be prepared by reaction of benzene and chlorine in the absence of a chlorination substitution catalyst such as ferric or aluminum chloride. The additive chlorination of benzene may be facilitated by employing actinic light, high frequency electromagnetic radiation, organic peroxides, or any combinations thereof, as promoters for the reaction. Actinic light is that light, usually about 2500 to 4500 A. in wave length, which produces chemical change.

At least five isomeric forms of benzene hexachloride are known to be produced by conventional addition chlorination processes. These have been designated alpha, beta, gamma, delta, and epsilon isomers. For certain purposes, such as in the insecticidal field, it is generally recognized that the gamma isomer has particular value. Accordingly, high gamma isomer in the benzene hexachloride is desirable. The various addition chlorination processes described in the literature are apparently only capable of providing products containing a maximum of from about 12 to 16 percent gamma isomer by weight of the total benzene hexachloride prepared.

According to the instant invention, a novel method of preparing benzene hexachloride by addition chlorination of benzene has been found, by operation of which, gamma isomer concentrations consistently above 20 percent and as high as 30 percent or more can be attained. Moreover, preparation of such high gamma isomer containing products may be achieved without sacrificing overall yields of benzene hexachloride, with nearly quantitative yields of benzene hexachloride being attainable, the normal yield exceeding ninety percent (90%) based upon the weight of chlorine added to the reaction.

Preparation of benzene hexachloride containing these unusually high gamma concentrations may be accomplished in accordance with this invention by reacting chlorine and benzene in a liquid reaction mixture containing a compound selected from the group consisting of acetic anhydride and acetyl chloride, maintaining the concentration of chlorine in the reaction mixture above about 0.005 percent and below about 1.5 percent by weight of the unreacted benzene and acetic anhydride or acetyl chloride, and maintaining the temperature of the reaction mixture below the freezing point of pure benzene, 5° C., but above the point at which the reaction mixture freezes.

It is emphasized that coordinated control of the chlorine concentration in the reaction mixture, the temperature of the reaction mixture and the use of acetic anhydride or acetyl chloride are required to prepare these unusually high gamma isomer concentrations. Unless all three of these reaction conditions are satisfied, it is not possible to achieve the high gamma isomer concentrations. Merely resorting to the use of one of these reaction conditions will not provide the desired gamma isomer concentration. Likewise, employing any combination of two of the reaction conditions will not provide suitable results. Only when all three of these reaction conditions are resorted to can gamma isomer concentrations in excess of 20 percent be provided.

The use of acetic anhydride and/or acetyl chloride has several advantages. Firstly, these compounds form low freezing point eutectic mixtures with benzene permitting reaction temperatures below 5° C., the freezing point of benzene, to be used thereby enabling the reaction to be performed in the liquid phase at the required low temperatures. Moreover, these compounds not only function as solvents for the benzene, but they produce a particular effect which is conducive to the formation of high concentrations of gamma isomer. The exact nature of this effect is not known. It is, however, emphasized that not all solvents for benzene which provide low freezing point eutectic mixtures containing benzene are capable of exerting such influence on the system whereby gamma isomer concentrations above 20 percent result. For instance, the use of carbon tetrachloride as a solvent while employing the other reaction conditions herein described (temperatures below 5° C. and chlorine concentrations between 0.005 and 2.0 percent by weight of unreacted benzene and solvent) does not provide gamma isomer percentages above 20 percent without resort to practice of this invention.

The particular amount of acetic anhydride or acetyl chloride which is employed with the benzene may be varied widely, depending on the temperature below 5° C. at which the reaction is effected. Percentages of from 5 to 95 percent of acetic anhydride or acetyl chloride by weight of the benzene and solvent may be employed. In general, higher percentages of acetic anhydride or acetyl chloride are conducive to best results and as high as 99 percent of acetic anhydride or acetyl chloride by weight may be utilized.

Sufficient acetic anhydride or acetyl chloride must be present with the benzene to produce a liquid solution of these components at the reaction temperature. Thus, more acetic anhydride or acetyl chloride is usually required to maintain the reaction mixture in a liquid state as lower temperatures are employed in accordance with the freezing point curve of the mixture. As stated, high percentages of acetic anhydride or acetyl chloride, even up to 99 percent, are within the scope of this invention, and are generally conducive to the formation of higher gamma isomer concentrations.

However, use of large amounts of acetic anhydride or acetyl chloride necessitates the recovery and recycling of large quantities thereof in a flow process where reactants are continuously withdrawn. The choice of a high ratio of acetic anhydride or acetyl chloride to benzene is, therefore, guided by balancing the respective advantages of the quality of the desired product and economic consideration necessary in producing a marketable product. At high concentrations, there may also be a tendency for undesirable chlorination of acetic anhydride or acetyl chloride to take place, thereby reducing the overall chlorine efficiency of the process. For most purposes, concentrations of about 30 to 95 percent of acetic anhydride or acetyl chloride by weight of acetic anhydride or acetyl chloride and benzene is employed.

In order to insure high gamma isomer concentrations, the reaction must be conducted at temperatures below the freezing point of benzene. Temperatures which favor high percentages of gamma isomer in the range of 20 to 30 percent gamma isomer, under optimum conditions, are between 5° C. and minus 40° C. It is, however, also possible to practice this invention at even lower temperatures so long as the mixture of benzene and acetic anhydride or acetyl chloride remains in the liquid state. As a general proposition, lower reaction temperatures favor higher gamma isomer concentrations in the final product. Determination of the most practical reaction temperature involves weighing the respective values of higher gamma isomer production and added refrigeration costs.

The reaction may be performed at subatmospheric and superatmospheric pressures, as well as atmospheric pressure. Cooling of the reaction may be accomplished by conducting the reaction at subatmospheric pressure and refluxing the most volatile component of the reaction mixture.

As already emphasized, the chlorine concentration in the reaction mixture during the reaction must be maintained below 1.5 percent and above 0.005 percent by weight of unreacted benzene and acetic anhydride or acetyl chloride in order to attain the contemplated gamma isomer concentrations. Preferably, chlorine concentrations below about 1.0 percent are employed. The exact chlorine concentration or range of chlorine concentrations which will provide an optimum amount of gamma isomer in any given reaction is dependent upon the specific reaction temperature below 5° C. employed, the concentration of benzene, and which material, acetic anhydride or acetyl chloride, is present. Highest gamma isomer concentrations have been achieved when the chlorine concentration has been less than 0.3 percent.

As a practical matter, it is often desirable to perform the reaction at chlorine concentrations which do not provide the optimum gamma. The rate at which benzene hexachloride is formed is related to the chlorine concentration with higher chlorine concentrations providing higher rates of formation. Frequently, chlorine concentrations which are higher than those which provide optimum gamma concentrations are utilized in order to obtain more favorable rates of production. The exact chlorine concentration, in this regard, is selected to provide the maximum amount of gamma production.

The invention is performed by placing benzene and acetic anhydride or acetyl chloride in a reactor equipped with a light and introducing liquid or gaseous chlorine into the reaction mixture at a controlled, preferably constant, rate. The precise chlorine concentration to be employed may be established by introducing chlorine into the reactor with the light source inoperative until a predetermined concentration is established and then continuing the addition of chlorine with the source operative. In such case, the rate of addition is essentially equal to the rate at which chlorine is consumed by the reaction. Alternatively, the chlorine concentration may be established by beginning irradiation concurrently with the start of chlorine addition and varying the rate of addition and/or intensity of irradiation.

The chlorine concentration is maintained as nearly constant as possible throughout the course of the reaction by varying the flow of chlorine or varying the intensity of irradiation in order to alter the rate of chlorine consumption by the reaction whenever the concentration becomes unduly high or low. Samples are withdrawn at regular intervals and analyzed to check the concentration.

Usually, the reaction is continued until a substantial portion of the benzene has been converted, such as when at least approximately 18 percent of the benzene has been reacted. The most advantageous point to stop the reaction varies considerably, depending to some degree on the proportion of benzene in the benzene-acetic anhydride reaction mixture. High conversions result in thick slurries which tend to become a sludge, particularly when acetic anhydride or acetyl chloride comprises a minor portion of the mixture. One reason for discontinuing the reaction before essentially all of the benzene has been converted is that acetic anhydride or acetyl chloride may compete with benzene for chlorine with undesirable chlorination of materials other than benzene, such as acetic anhydride, resulting. It is to be noted that the degree of conversion has no material effect on the production of the gamma isomer concentrations of at least 20 percent by weight. However, it does present operational and economic problems, and for such reasons the reaction should be discontinued before more than 50 to 75 percent of the benzene is reacted, or while the benzene concentration in the reaction mixture exceeds one or two percent by weight of the unreacted benzene and acetic anhydride or acetyl chloride.

It is to be recognized that the additive chlorination of benzene effected in the practice of this invention may be promoted by recourse to various catalytic means other than actinic light including high frequency electromagnetic irradiations or organic peroxides which are effective below 5° C. Such peroxides include peroxydicarbonate esters such as isopropyl peroxydicarbonate and low temperature peroxides including phenyl acetyl peroxide and trichloroacetyl peroxide. These catalytic means may be employed alone or in combination with each other. Similarly, they may be used in cooperation with actinic irradiation or in lieu thereof.

Best results are achieved when certain precautions are taken. The presence of air or other impurities in the reaction zone should be avoided. This is particularly true when sampling is performed. The benzene, chlorine, and acetic anhydride or acetyl chloride are preferably purified prior to reaction by suitable methods. It is highly desirable to purge the reaction system prior to the introduction of chlorine and the chlorine should be introduced in the presence of nitrogen. Further, the system should be free from all substances which might promote substitution chlorination of benzene, acetic anhydride, or acetyl chloride.

The benzene hexachloride prepared by recourse to this invention is recovered by removing the acetic anhydride or acetyl chloride therefrom, as well as any unreacted benzene. This may be accomplished by distillation, all three of these materials being more volatile than benzene hexachloride. In practice, when acetyl chloride is employed, it is removed by atmospheric distillation and thereafter benzene is removed by a combination of atmospheric and vacuum distillation. The benzene hexachloride is usually molten and is flaked or at least charged directly to storage or shipping containers.

When acetic anhydride is present in the reaction mixture, benzene may be first removed by atmospheric and/or vacuum distillation. Acetic anhydride may thereafter be removed by distillation or by washing with water.

The following example illustrates the manner in which the invention may be practiced, but is not to be construed as imposing any limitation thereon:

EXAMPLE I

The experiments were performed with a circulatory apparatus, the description of which may be more readily presented by reference to the accompanying drawing.

The circulatory apparatus consisted of a U-shaped glass tube 1 (similar to a Thiele melting point tube) having vertical columns 2 and 3 and a glass tubular member 4 with an outer diameter of approximately three centimeters connecting the upper portion of each vertical column whereby a continuous circular path within the apparatus is provided. Vertical columns 2 and 3 were 6 centimeters in diameter (outer) and had openings at the top. Glass tube 6, with an outer diameter of approximately 4 centimeters, was placed in column 2 and held in place therein with rubber stopper 10.

High-speed propeller 12 driven by motor 13 was inserted into column 3. The chlorine and nitrogen inlet 14 was provided near the top of column 3. Outlet 15 equipped with a four-millimeter stopcock was provided for sample removal near the bottom of the column. Thermometer 16 was inserted in tube 4. Condenser 11 was cooled with a Dry-Ice acetone mixture to condense the more volatile components, such as acetyl chloride, and return them to the reaction zones.

The apparatus was covered with black friction tape 17 to exclude all light with the exception of a 3½-inch high window beginning about 5¼ inches from the bottom of column 3. The window extended halfway around the outer circumference of the column, approximately 4 inches. Irradiation to promote the reaction was provided by a 275-watt Westinghouse RS Sun Lamp placed at the desired distance from the window, 3/16 to 1 inch. Frosting on the window was avoided by passing a slow stream of acetone thereover.

The apparatus was charged with the appropriate quantities of benzene and acetic anhydride or acetyl chloride and inserted in cooling bath 18 containing a Dry-Ice acetone coolant to provide the desired reaction temperature. This system was purged for a period of 90 to 105 minutes with nitrogen that had been scrubbed with pyrogallol. Gaseous chlorine was passed from a cylinder to a point just before inlet tube 14 where it was directed into caustic traps to saturate the entire system with chlorine to avoid any holdup in safety traps which might affect accurate control of the chlorine concentration.

Some 5 to 10 minutes prior to beginning the introduction of chlorine via member 14, the lamp was turned on in order to obtain maximum light intensity at the beginning of the experiment. Chlorine was introduced at the conclusion of this period. Samples were removed via tube 15 every 15 minutes and the free chlorine concentration determined iodometrically.

At the conclusion of the run, benzene and acetyl chloride were removed by atmospheric distillation followed by vacuum distillation. If acetic anhydride was used, the reaction mixture was shaken with water in a separatory funnel and the benzene layer was separated. Thereafter, benzene was removed by distillation.

In these distillations, the temperature of the molten mass was allowed to reach 150 C. under a vacuum of 20 inches of mercury. The molten benzene hexachloride was poured onto a nickel plate and permitted to solidify at room temperature, about 25° C. This solid was ground to a fine powder and analyzed for isomer distribution by infrared methods.

The following tables summarize the reaction variables and results of experiments performed in the above-outlined manner:

While the invention has been described with reference to batchwise processes, it is also suitable for adaption to continuous flow processes. In such process, the benzene and acetic anhydride are separated from the reaction mixture which is continuously or semi-continuously removed from the reaction zone and are recycled to the zone with addition benzene and acetic anhydride makeup. In the event large-sized reaction zones are employed, dispositing the light within the reactor is preferable to insure more uniform and complete irradiation.

Although the present invention has been described with particular reference to specific details of certain embodiments thereof, it is not intended that such details shall be regarded as limitations upon the scope of the invention except insofar as defined in the appended claims.

We claim:

1. A method of producing benzene hexachloride by catalytic additive chlorination of benzene with chlorine which comprises performing the reaction in a liquid reaction mixture of benzene and a compound selected from the group consisting of acetic anhydride and acetyl chloride, while maintaining the concentration of chlorine in the mixture between about 0.005 and 1.5 percent by weight of the benzene and said compound and maintaining the temperature of the reaction mixture below the freezing point of benzene.

2. The method of claim 1 wherein the compound is acetic anhydride.

3. The method of claim 1 wherein the compound is acetyl chloride.

4. A method of producing benzene hexachloride which comprises irradiating a liquid mixture of benzene and a compound selected from the group consisting of acetic anhydride and acetyl chloride with actinic light, introducing chlorine into the mixture at a rate sufficient to provide an appreciable chlorine concentration in said mixture above about 0.005 and below 1.5 percent by weight of the benzene and compound and maintaining the reaction temperature below the freezing point of benzene.

5. The method of claim 4 wherein the compound is acetic anhydride.

*Table I.—Benzene-acetic anhydride mixture*

| Temp., ° C. | Charge—Moles | | Average Chlorine Conc., percent | Light Distance, Inches | Isomer Content, percent | | | | |
|---|---|---|---|---|---|---|---|---|---|
| | Benzene | Acetic Anhydride | | | α | β | γ | Δ | ε |
| −30 | 1.201 | 4.579 | 0.050 | 1 | 53.7 | 3.6 | 30.6 | 8.9 | 2.2 |
| −30 | 1.201 | 4.579 | 0.056 | 1 | 56.9 | 4.5 | 28.7 | 9.0 | 2.2 |
| −30 | 2.210 | 5.150 | 0.109 | | 51.1 | 6.4 | 26.8 | 8.6 | 2.9 |
| −30 | 1.201 | 4.579 | 0.130 | 1 | 53.0 | 6.6 | 29.4 | 8.8 | 1.7 |
| −30 | 1.201 | 4.579 | 0.314 | 1 | 45.3 | 9.3 | 24.7 | 14.6 | 5.5 |
| −37 | 1.324 | 5.756 | 0.106 | ¾ | 52.3 | 6.5 | 30.0 | 8.7 | 2.0 |
| −40 | 1.201 | 4.579 | 0.037 | 1 | 50.3 | 5.4 | 30.5 | 10.9 | 3.3 |
| −40 | 1.201 | 4.579 | 0.043 | 3/16 | 53.1 | 3.9 | 30.2 | 9.7 | 2.4 |
| −40 | 1.201 | 4.579 | 0.088 | 3/16 | 50.9 | 6.8 | 30.2 | 9.1 | 0.8 |
| −40 | 1.336 | 5.834 | 0.122 | 3/16 | 49.2 | 10.2 | 26.2 | 11.8 | 2.1 |
| −40 | 1.324 | 5.756 | 0.123 | ¾ | 49.3 | 6.8 | 27.9 | 11.3 | 3.6 |
| −40 | 1.201 | 4.579 | 0.142 | 3/16 | 49.2 | 7.1 | 28.6 | 11.1 | 2.9 |
| −40 | 1.201 | 4.579 | 0.143 | 3/16 | 47.7 | 8.9 | 26.7 | 12.7 | 1.3 |
| −40 | 1.201 | 4.579 | 0.181 | 3/16 | 47.7 | 9.9 | 24.7 | 12.6 | 2.7 |
| −40 | 1.201 | 4.579 | 0.277 | 3/16 | 48.4 | 8.4 | 27.8 | 12.1 | 3.6 |
| −40 | 1.324 | 5.756 | 0.285 | ¾ | 43.0 | 12.2 | 20.4 | 15.1 | 3.8 |

*Table II.—Benzene-acetyl chloride mixture (80 mole percent acetyl chloride)*

| Temp., ° C. | Average Chlorine Conc.—Percent | Gamma Isomer Conc.—Percent |
|---|---|---|
| −15 | 0.089 | 24.6 |
| −15 | 0.140 | 27.4 |
| −15 | 0.179 | 24.4 |
| −15 | 0.187 | 26.5 |

6. The method of claim 4 wherein the compound is acetyl chloride.

7. The method of claim 4 wherein the chlorine concentration in the reaction mixture is below 1.0 percent by weight of the benzene and compound.

8. A method of producing benzene hexachloride by catalytic additive chlorination of benzene with chlorine which comprises performing the reaction in a liquid reaction mixture of benzene and acetic anhydride, while maintaining the concentration of chlorine in the mixture at about 0.3 percent by weight of the benzene and acetic anhydride and maintaining the temperature of the reaction mixture between about 5° C. and −40° C.

References Cited in the file of this patent

UNITED STATES PATENTS

| | | |
|---|---|---|
| 2,513,092 | Gonze | June 27, 1950 |
| 2,558,363 | Kolka et al. | June 26, 1951 |
| 2,717,238 | Neubauer et al. | Sept. 6, 1955 |

FOREIGN PATENTS

| | | |
|---|---|---|
| 656,457 | Great Britain | Aug. 22, 1951 |